Patented Apr. 16, 1940

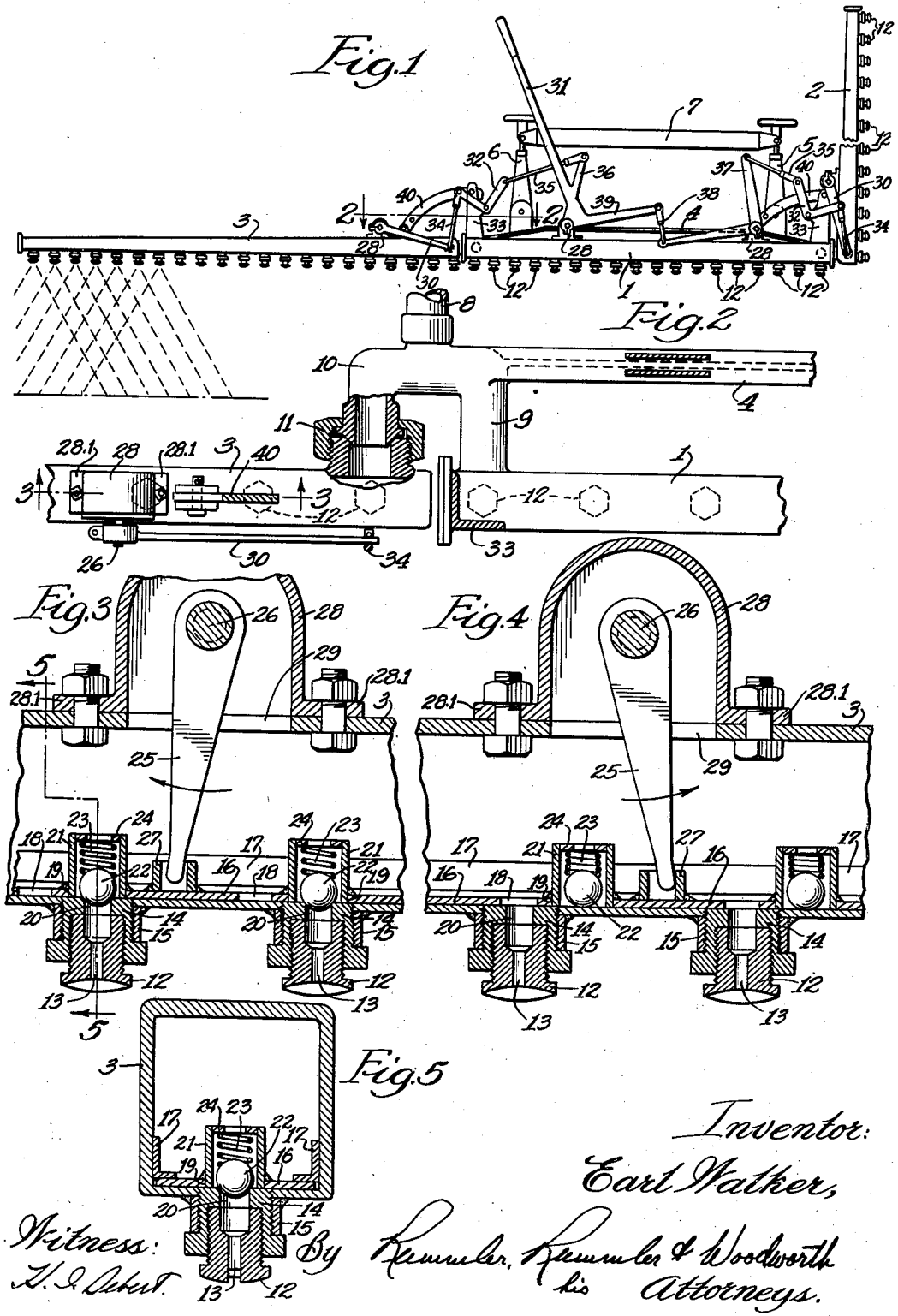

2,197,231

UNITED STATES PATENT OFFICE 2,197,231

VALVE CONSTRUCTION

Earl Walker, Sullivan, Ill.

Application July 28, 1937, Serial No. 156,148

3 Claims. (Cl. 299—39)

This invention relates to improvements in valves and particularly valves for spray apparatus wherein a plurality of nozzles are to be simultaneously controlled individually.

The main objects of this invention are to provide an improved valve control means; to provide an improved valve operating mechanism; to provide an improved valve mechanism for valves that are subjected to heat and temperature changes; to provide an improved valve mechanism for valves arranged in gangs; to provide an improved valve mechanism for instantly controlling a plurality of individual valves simultaneously; and to provide an improved valve construction wherein a gang of individual valves may be instantly and positively controlled.

A specific embodiment of this invention is shown in the accompanying drawing wherein:

Fig. 1 is a view in elevation of a road spraying apparatus embodying the improved valve and valve spraying mechanism.

Fig. 2 is an enlarged fragmentary top plan view of the spraying apparatus as taken on line 2—2 of Fig. 1.

Fig. 3 is an enlarged fragmentary sectional view as taken on line 3—3 of Fig. 2 showing the valves and operating mechanism in closed position.

Fig. 4 is a similar view showing the valves and operating mechanism in open position, and, Fig. 5 is a sectional view as taken on line 5—5 of Fig. 3.

In the form shown in the drawing my invention is embodied in a road spraying apparatus comprising a central distributor bar 1 and a pair of lateral distributor bars 2 and 3 projecting beyond respective ends of the distributor bar 1, the distributor bars being carried on suitable frame work 4 not shown herein in detail, carried by suitable supporting members 5 and 6, which in turn, are supported from a member 7 which may be a part of a truck chassis.

Each of the spray bars or distributor bars 1, 2, and 3 comprises a hollow tubular body closed at each end and having suitable connection with a supply pipe 8, as shown in Fig. 2, the supply pipe 8 having a pair of branches 9 and 10 connected respectively to the central spray bar 1, and one of the lateral spray bars 3; there being a supply pipe and suitable branches at each end of the distributor bar 1 to supply it and the respective lateral bar. Also, as shown each lateral spray bar is provided with a swivel or pivotal connection with the respective supply pipe branch 10, in order to permit the lateral spray bars being swung upwardly to a vertical position, as shown at the right hand side of Fig. 1. Such swivel or pivotal connection is provided by the swivel coupling 11 shown in Fig. 2.

A plurality of nozzles 12 each having a bore 13 therethrough are spaced along the bottom side of each spray bar or distributor bar, each nozzle having communication, through its body 14, with the interior of the tubular spray bar on which it is mounted. As shown in Figs. 3, 4, and 5, each nozzle is an externally threaded cylindrical member having threaded engagement with an externally threaded nozzle body member 14, which in turn, is threaded into a collar 15 integral on the distributor bar body, the nozzle body 14 being arranged so that its end will be flushed with the inner surface of the tubular distributor bar.

An individual slide bar or valve carrying member 16 is mounted on the inside of each tubular distributor bar, so as to be longitudinally shiftable relative thereto, the slide bar 16 of each distributor bar riding between suitable guide members 17 which serve to keep the slide bar in position against the bottom inner surface of the distributor bar. As shown in Figs. 3 and 4, the slide bar 16 is provided with a pair of spaced apertures 18 and 19 for each spray nozzle, and the slide bar 16 is shiftable to bring the apertures 18 and 19 selectively into registry with a valve opening 20 centrally located in each respective spray nozzle body 14.

A cylindrical valve housing 21 is mounted on the slide bar 16 over each of the apertures 19 therethrough, said valve housing projecting upwardly from the slide bar into the interior of the distributor bar, in order to provide a housing for a spherical valve member 22 and a valve member actuating spring 23, and each valve housing 21 is provided with an inwardly projecting flange 24 at its upper end against which one end of the spring 23 is seated. The spherical valve member 22 is disposed between the spring 23 and the inner surface of the distributor bar along which it rolls upon shifting of the slide bar 16.

As shown, the passageway or valve opening 20 through the nozzle body member 14 is of lesser diameter than the spherical valve member 22. Hence, when the slide bar 16 is shifted so that the valve aperture 19 is in registry with the valve opening 20 of the nozzle body member 14, the spherical valve member will engage and seat in the end of the opening 20 and close the same.

Each valve member 22 is of such size as to roll freely within its respective housing 21, except for the friction exerted by the actuating spring 23. Thus, when the slide bar 16 is shifted longitudinally of the spray or distributor bar in which it is mounted, the spherical valve member 22 will be engaged by the side wall of the valve housing 21 and caused to roll away from its seat on the inner end of the passageway or opening 20, and along the inner surface of the distributor bar until the slide bar 16 has been shifted to such an extent that the aperture 18 therethrough is brought into registry with the passageway 20 leading to the valve nozzle 12.

In this position, the valve is open and there will be a free flow from the interior of the spray distributor bar through the aperture 18 in the slide bar 16 into the passageway 20, and thence to the spray nozzle 12.

Backward shifting of the slide bar 16 will cause the spherical valve 22 to be carried by its housing 21 until the valve member 22 is again in registry with the inner end of the passage 20, at which point the valve member 22 will under the action of the spring 23, become seated in the end of the passage or valve opening 20 to tightly close the same.

It will now be readily apparent that with the above described construction, substantially any number of spray nozzles may be simultaneously and positively controlled by a single shiftable slide bar on which an equal number of valve members, one for each nozzle, are suitably spaced and mounted.

The operation of each slide bar 16 is accomplished by means of a respective slide bar actuating unit which comprises a crank arm 25 fixedly mounted on a shaft 26 and arranged to extend downwardly into the interior of the distributor bar where its inner end is engaged in a socket 27 formed by an annular upwardly projecting collar integral on the slide bar 16. The crank 25 is preferably tapered toward the slide bar engaging end and suitably arranged so as not to bind in the socket 27 upon shifting movement of the slide bar. The shaft 26, on which the crank 25 is secured, is rotatably mounted in a hollow housing 28 mounted on and projecting from the upper surface of the distributor bar, and the crank 25 extends downwardly therefrom through an opening 29 in the upper wall of the distributor bar, which opening is covered by the housing 28 and sealed by the flange 28.1.

Also, the shaft 26 projects outwardly from the side of the housing 28 through a suitable gland, not shown, and an operating arm 30 is secured on the outwardly projecting end of the shaft 26. Thus, by shifting the arm 30 and thereby rotating the shaft 26, the crank arm 25 is caused to shift laterally and, in turn, shift the slide bar 16 to bring the aperture 18 therein, or the valve member 22 and its housing, into registry with the respective spray nozzle passageway 20.

As shown in Fig. 1, the valve spraying mechanism is so arranged that all the valves in each of a plurality of spray bars or distributing bars may be simultaneously controlled by means of a main lever 31. As shown, the lever 31 is pivotally mounted on the central spray bar 1, and projects upwardly therefrom so as to be readily accessible and operable. Preferably the lever 31 is fixed on the outwardly projecting portion of the crank shaft 26 of one of the units which controls the operation of the slide bar 16 of the central distributor bar 1. Thus, shifting of the main lever 31 will directly actuate the slide bar of the central spray member.

Suitable linkage is provided between the main lever 31 and the respective operating arms 30 for the slide bar actuating units of the lateral distributor bars 2 and 3, in order that upon movement of the main lever 31, which will actuate the slide bar of the central distributor bar 1, the slide bars of the lateral distributor bars 2 and 3 will be simultaneously operated. This linkage may be of any convenient arrangement, and as shown in Fig. 1, comprises, for each lateral distributor bar, a bell crank 32 pivotally mounted on a support 33 which extends upwardly from the adjacent end of the central distributor bar 1, the arms of the bell crank 32 being respectively connected by means of links 34 and 35 with the operating arm 30 of the lateral distributor bar and a branch arm of the main lever 31.

In the case of the lateral distributor bar 3, the link 35 is connected directly to a branch arm 36 of the main lever 31; and in the case of the lateral distributor bar 2, the link 35 is connected to one arm of a second bell crank 37, the other arm of which is connected by a link 38 with a second branch arm 39 of the main lever 31. The bell crank 37 is pivotally mounted on the distributor bar 1 in any suitable manner such as a second control unit comprising a shaft 26 rotatably mounted in a housing 28 which may be a duplicate of that on which the main lever 31 is mounted.

An essential feature, however, of the linkage between the main lever 31 and the respective operating levers 30 is the arrangement whereby the pivot connection between each link 34 and the respective operating arm 30 is located so as to be disposed at the axis on which the respective lateral distributor bar pivots when it is swung to a vertical position, thus obviating the necessity of disconnecting the linkage from the operating arm so that the setting of the valve mechanism of the elevated distributor bar will not be disturbed. This arrangement is clearly shown in Fig. 1, and particularly at the right hand side thereof, wherein the lateral distributor bar 2 is shown in its elevated position. With this arrangement the lateral distributor bars may be elevated whenever the valve mechanism is in an off position without disturbing the control mechanism for the same.

When it is desired to use a multiple spray equipment, such as that shown in Fig. 1, with the central distributor bar and only one of the lateral distributor bars in operation, the valve control linkage for the elevated bar may be disconnected at any suitable place in the linkage chain so as to allow operation of the valve mechanism for the horizontal bars without disturbing the shut-off valve setting of the elevated bar.

Such disconnectible arrangement of the control linkage is not shown in detail in the drawing, but it is apparent that disconnection can be readily accomplished at the pivot or wrist-pin joint between any suitably located pair of links. For example, in the arrangement shown in Fig. 1, wherein the distributor bar 2 is in elevated position, the link 35 may be connected to the respective arm of the bell-crank 37 by a removable pivot normally held in connected position by a removable cotter pin. Thus with the bar 2 in elevated position, the link 35 may be disconnected from the bell-crank 37 and allowed to hang free permitting the remainder of the control linkage to be operated by the main lever 31 in the normal manner.

This arrangement is particularly advantageous in road spraying equipment wherein it is necessary to quickly elevate and lower the lateral distributor bars without disturbing the position of the valve operating mechanism. As shown, in Fig. 1, each of the lateral distributor bars 2 and 3 is provided with a quadrant 40 by means of which, in conjunction with the vertical supports 33, the lateral distributor bars may be locked in either the elevated or lowered positions by means of a bolt or pin passing through suitable registering openings in the vertical support 33 and the quadrant 40.

The main advantages of my invention reside in the construction whereby a valve or a plurality of valves can be individually operated by valve mechanisms which will not be affected by heat or temperature changes in the medium in which the valve operates. Several different types of valve construction have heretofore been employed for the control of gangs of spray nozzle valves. However, substantially all of these devices are subject to the objection that when they are operating in or controlling the flow of a hot liquid material, such as the bituminous material used for road dressings, the valve mechanisms tend to expand so as to either bind the individual valves and render them inoperative or so expand the casing in which the valve mechanism operates as to prevent a positive shut-off when it is desired that the valve be closed.

Other advantages lie in the simplicity of the construction and the practical certainty of its properly operating under substantially all conditions of use. Other advantages lie in the arrangement wherein a gang or plurality of valves may be individually, positively, and simultaneously actuated by a single valve operating mechanism.

Other advantages are also found in the linkage arrangement for simultaneously operating a plurality of control units wherein pivoted lateral extensions of a spray or distribution equipment may be pivotally elevated or lowered without disturbing the closed position setting of the control units.

Although but one specific embodiment of this invention is herein shown and described, it will be understood that details of the construction shown may be altered or omitted without departing from the spirit of this invention as defined by the following claims.

I claim:

1. A spray equipment comprising a pair of individual tubular distributor bars arranged in end to end relation and each having a plurality of longitudinally spaced discharge openings, and supply connections to the adjacent ends of said distributor bars, each of said distributor bars having a valve mechanism therein comprising a longitudinally extending shiftable slide bar covering said discharge openings and having a plurality of spaced apertures alternate ones of which are in registry with said discharge openings, a valve element in each of said registering slide bar apertures having a portion extending therethrough and seating in a respective discharge opening to close the same, means normally urging said valve elements to seat in said discharge openings, a hollow housing on the outside of each of the distributor bars having communication therethrough with the interior thereof, a respective operating shaft extending into each of said housings and journaled therein, and a crank arm fixed on each of said shafts within its respective housing and extending into the respective distributor bar to engage the said slide bar therein whereby upon rotation of said operating shaft said crank arm will shift said slide bar and bring the other apertures thereof into registry with the respective discharge openings, an operating arm on the operating shaft of each distributor bar to rotate said operating shaft, and control means having connection with each operating arm whereby the valve mechanisms of said distributor bars are operated simultaneously.

2. A spray equipment comprising a pair of individual tubular distributor bars arranged in end to end relation and each having a plurality of longitudinally spaced discharge openings, and supply connections to the adjacent ends of said distributor bars, each of said distributor bars having a valve mechanism therein comprising a longitudinally extending shiftable slide bar covering said discharge openings and having a plurality of spaced apertures alternate ones of which are in registry with said discharge openings, a valve element in each of said registering slide bar apertures having a portion extending therethrough and seating in a respective discharge opening to close the same, means normally urging said valve elements to seat in said discharge openings, a hollow housing on the outside of each of the distributor bars adjacent the supply connection end thereof, each of said housings having communication with the interior of its respective distributor bar, a respective operating shaft extending into each of said housings and journaled therein, a crank arm fixed on each of said shafts within its respective housing and extending into the respective distributor bar to engage the said slide bar therein whereby upon rotation of said operating shaft said crank arm will shift said slide bar and bring the other apertures thereof into registry with the respective discharge openings, and an operating arm on each of said operating shafts to rotate the same, one of said distributor bars being arranged to pivot on its respective supply connection, and control means having connection with each operating arm whereby the valve mechanisms of said distributor bars are operated simultaneously, the operating arm of said one distributor bar being disposed with the connection to said control means positioned on the axis of the respective supply connection when said valve mechanism is at its closed position.

3. A spray equipment comprising a pair of individual tubular distributor bars arranged in end-to-end relation and each having a plurality of longitudinally spaced discharge openings, and supply connections to the adjacent ends of said distributor bars, each of said distributor bars having a valve mechanism therein comprising a longitudinally extending shiftable slide bar carrying a plurality of spaced valve elements arranged to control said discharge openings, crank means on the outside of each of said distributor bars adjacent the supply connection end thereof and extending thereinto arranged to shift said slide bar longitudinally in the distributor bar, an exterior operating arm on each of said crank means to actuate the same, one of said distributor bars being arranged to pivot on its respective supply connection, and common control means interconnecting said operating arms whereby the valve mechanisms of said distributor bars are operated simultaneously, the operating arm of said one distributor bar being disposed with the connection of said control means positioned on the axis of the respective supply connection when said valve mechanism is at its closed position.

EARL WALKER.